Jan. 2, 1945.  J. C. MILLER  2,366,638
RESILIENT TIRE CONSTRUCTION
Filed Dec. 2, 1942
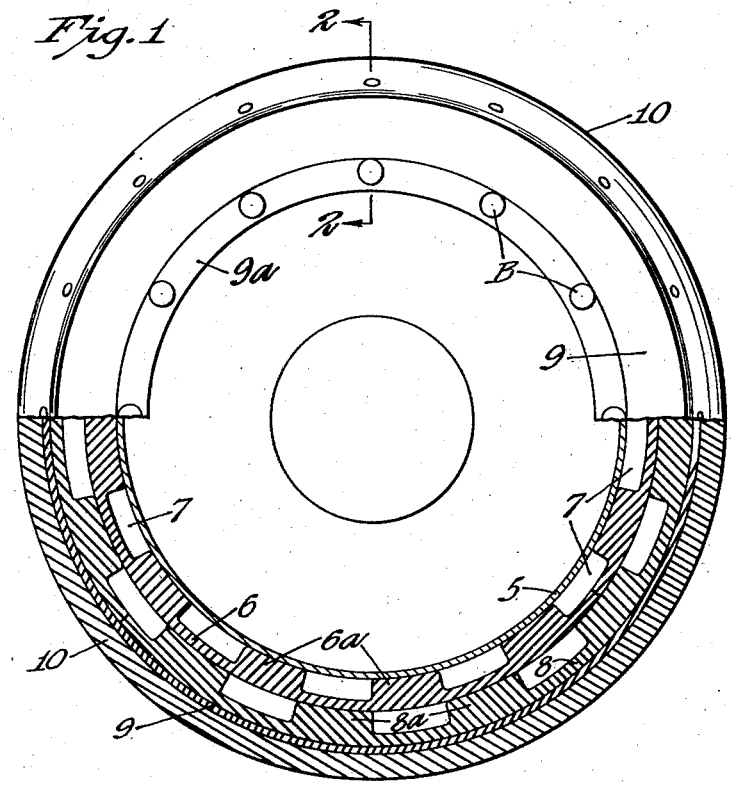
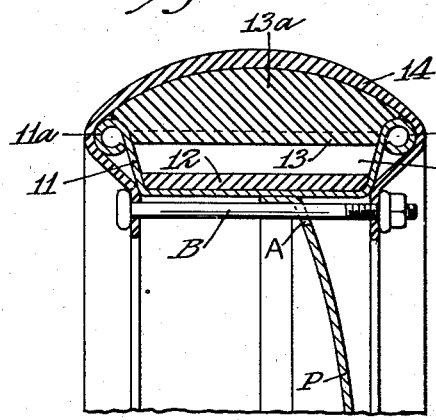
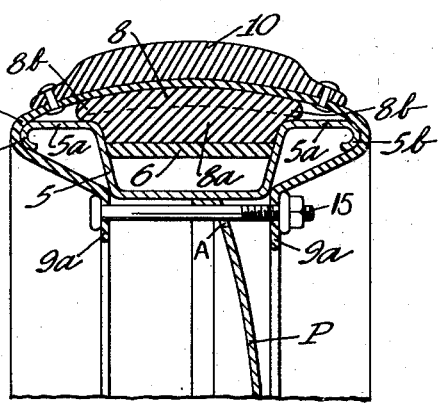
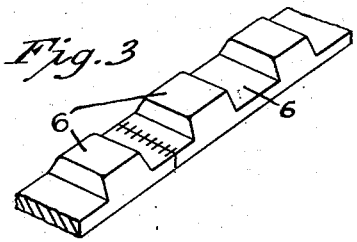
Inventor
Joseph C. Miller
By Williamson & Williamson
Attorneys Patented Jan. 2, 1945

2,366,638

UNITED STATES PATENT OFFICE 2,366,638

RESILIENT TIRE CONSTRUCTION

Joseph C. Miller, Russell, Minn.

Application December 2, 1942, Serial No. 467,601

2 Claims. (Cl. 152—315)

This invention relates to non-inflatable vehicle tires possessing to a considerable extent the resilient and shock cushioning qualities of the conventional pneumatic tires, but having far greater durability and economy.

It is an object of my invention to provide a comparatively simple, economical and efficient vehicle tire particularly adapted for use during the duration of the present World War and thereafter until rubber is available in quantities adequate for use in pneumatic tire constructions.

A further object is the provision of a non-inflatable tire employing a combination resilient substance and air cushioning media with the elimination of rubber inner tubes and rubber tire casings.

More specifically it is an object to provide a durable resilient tire construction employing two or more concentric cushioning pads defining, in cooperation with the felly of a motor vehicle wheel and a covering, a multiplicity of air pockets which, with the cooperation of the resilient cushioning construction and other shock resistive factors, attains to a considerable extent the shock absorbing and other desirable qualities of the present pneumatic tire.

A further object is the provision of cushioning bands of the type referred to related with a rim and covering to form a substantially sealed tire construction within the covering or casing whereby the compressibility and elasticity of the multiplicity of the physical cushions is combined with air cushioning effects set up in the multiplicity of air spaces provided within the sealed cover by the visible structure.

These and other objects and advantages of the invention will more fully appear from the following description made in connection with the accompanying drawing, wherein like reference characters refer to the same parts throughout the views, and, in which:

Fig. 1 is a view partially in side elevation and partly in vertical section of an embodiment of my invention;

Fig. 2 is a cross section taken on the line 2—2 of Fig. 1;

Fig. 3 is a fragmentary perspective view of one of the cushioning bands of my tire construction removed and laid out flatwise; and Fig. 4 is a cross sectional view similar to Fig. 2 of a somewhat different embodiment of my invention.

In the form of the invention shown in Figs. 1 to 3 inclusive there is shown a disc automobile wheel having the disc or body plate P of conventional construction as illustrated provided with a rim or felly 5 of special construction for reception of and cooperation with my improved tire construction. The rim 5 has a rather wide centrally disposed channel tapering somewhat from the outer peripheral portion of the rim to the circumferential bottom of the channel. The rim 5 is formed to constitute at either side of the channel substantially flat vehicle supporting flanges 5a which are joined with the channel forming portion of the rim along rounded or curved connection portions. The extremities of the vehicle supporting flanges 5a are turned or curved inwardly to afford smooth rounded sealing edges 5b the purpose of which later will be made apparent. The rim 5 is spot welded, bolted or otherwise secured to a peripheral flange formed integrally with the disc plate P in conventional fashion.

Within the bottom or inner portion of the channel or rim 5 and extending circumferentially of the wheel proper is provided a cushioning band 6 preferably integrally formed and having a series of spaced substantially rectangular cushioning blocks 6a, the exterior of said band 6 preferably being continuous and substantially smooth in the form of Figs. 1 to 3 and the flat surfaces of the cushioning 6a lying flush against the bottom circumferential portion of the rim in substantially sealed contact therewith. The band 6 is tapered somewhat from its outer to its inner circumferential surfaces to cooperate with the tapered construction of the channel and to apply wedge resistance in compression and shock absorbing functions. In applying the cushioning band 6, the same is tightly stretched around the felly and within the channel formed thereby it is suitably connected together at its ends by preferably a plurality of spaced fastening means or lacing to place the annular band formed under some tension.

A second cushioning band 8 is superimposed in the felly or rim about the band 6 and like band 6 is preferably integrally formed with a multiplicity of spaced substantially rectangular cushions 8a which are staggered when the bands are assembled with reference to the cushions 6a of the inner band, and the cushions 8a' have substantially smooth contacting surfaces engaging the outer circumferential surface of band 6 and substantially sealed therewith at the portions of band 6 between the cushions 6a. The spacing of the cushions 6a and the cushions 8a of the respective bands is approximately equal to the width of the cushions, and the cushions are preferably tapered slightly from their connection with the band proper to their contacting surfaces. The outer band 8a is tapered in cross sectional shape to conform to the outer portion of the channel afforded by the rim 5 and is further provided with shock resisting shoulder 8b which normally rides upon the rounded curved circumferential portions of the rim joining the channel forming central sections with the flanges 5a. The outer circumferential portion of the outer band 8 is curved in cross sectional shape and normally is disposed a substantial distance above the circumference of the vehicle supporting portions 5a of the rim or felly. Cushioning band 8 is attached in the manner of band 6 being superimposed above the inner bands and tightly drawn with its ends efficiently connected to place the annular member formed under some tension.

Cushioning bands 6 and 8 may be constructed of any suitable fibrous, gummy or other substance having resilient, flexible and preferably compressible characteristics such as compositions containing rubber, fibrous spongy compositions, and the like.

A covering or casing 9 constructed of very tough relatively non-stretchable material such as leather is provided superimposed over the outer cushioning band 8, and the entire external portion of the casing having reinforced marginal attachment portions 9a which are provided with a multiplicity of circumferentially spaced apertures for receiving tightening means such as the clamping bolts 15 which extend therethrough and through circumferentially spaced apertures A formed in the body plate P in the wheel adjacent its attachment with the rim 5. In attaching the casing or covering 9 the same is disposed circumferentially of the wheel and centrally disposed circumferentially of the outer cushioning band 8. The marginal edges are then drawn together by tightening the clamping bolts progressively until the entire casing is tensioned and tightly drawn about the sealing edges 5b of the outer rim portions. A detachable or repressible tread band 10 of a suitable durable composition is riveted or otherwise secured at closely spaced intervals to the covering 9.

In operation the structure described provides a multiplicity of staggered elastic cushions 6a and 8a and a multiplicity of adjacent staggered air spaces interspersed with the said cushions. The compartments defining the air spaces are to a measure sealed although, of course, breathing in such spaces takes place during the revolution of the wheel and in view of the load carried. The tapering of the concentric cushioning bands in cross sectional shape and their inter-relation with the tapered channel of the rim offers wedge resistance as well as side edge sealing of the bands in the cushioning action. Two bands 6 and 8 will maintain the cushion staggered relation during travel of the vehicle since the cushions 8a normally seat themselves in the more flexible and compressible portions of the inner band between the cushions 6a. This relationship also prevents the bands from bunching up within the casing even though there be some slippage of the bands upon the rim due to torque which is applied. The sealed relation of the covering 9 with the rounded sealing edges 5b of the rim materially restricts the free draft or expulsion of air from inside of the tire construction therefore materially improving the pneumatic action produced by the multiplicity of staggered air pockets 7. The enlarged outer portion of the outer cushioning band 8 and its relation with the rounded throat portion of the channel offer resistance to jolts and shocks although permitting the band under sharp jolts or larger obstacles such as rocks and road bumps to compress and retract into the felly. The supporting flanges 5a offer a broader area of support in the event through very long continued usage the elasticity of the cushioning bands 8 becomes materially weakened or impaired before replacement is made. Such tires properly constructed should last without replacement of either tread or cushioning bands far in excess of one hundred thousand miles in ordinary road travel.

The structure illustrated in Fig. 4 is in many respects similar to the embodiment of the invention first described with the exception of the following differences. In this second form of the invention the rim 11 throughout most of its width defines a very wide cushioning band receiving channel tapered in cross sectional shape from its exterior to its circumferential wheel attachment bottom and having its marginal edges rolled inwardly to provide beaded sealing edges 11a for engagement with the casing 14.

The cushioning bands 12 and 13 of this form have their cushions 12a and 13a disposed outwardly rather than inwardly as in the form just described. The inner band 12 is preferably integrally constructed carrying a series of spaced substantially rectangular cushions 12a and fitting the inner portion of the annularly disposed channel formed by the rim and installed in such channel under some tension with the ends of the band efficiently connected together. In cross sectional shape this band 12 and the cushions carried thereby are tapered from the external portion inwardly to fit the tapered cross sectional construction of the channel. The outer circumferential band 13 is superimposed with its continuous surface against the contact outer surfaces of the cushions 12a and with the cushions 13a staggered with respect to the cushions 12a of the inner band. Spaces between the cushions 12a and the cushions 13a approximately equal to the width of the cushions providing, as in the form first described, a multiplicity of interspersed and staggered air pockets. The cushions 13a have their external portions somewhat enlarged and contoured to produce tread engaging surfaces at their exterior circumferential area. The tread casing 14 is made from tough, durable, relatively non-stretchable material and is preferably thickened at its tread portion for wear and is applied and tightened about the outer band 13 by suitable means such as the clamping bolts B.

This second form of the invention functions in the manner of the form first described.

From the foregoing description it will be seen that I have provided a very durable, simple, and comparatively inexpensive tire construction particularly adapted for motor vehicles and capable of being manufactured economically either with the elimination of rubber tires or with use of a relatively small amount of rubber in composition form.

It will, of course, be understood that various changes may be made in the form, details, arrangement and proportions of the various parts without departing from the scope of my invention.

What is claimed is:

1. A vehicle tire construction having in combination a rim provided with a relatively wide central circumferential channel tapered from its open portion inwardly, a pair of cushioning bands disposed circumferentially of said rim and mounted concentrically thereof with at least portions of said bands seated in said channel and frictionally engaging the sides thereof, the cross sectional shape of said bands being tapered to closely conform with the cross sectional shape of said channel, said bands each carrying a multiplicity of spaced substantially rectangular elastic cushions, the cushions of said two bands being staggered and providing through their spaced relationship a multiplicity of staggered interspersed air pockets, the cushions of one band contacting the other band along areas disposed between the cushions of the second band, and means for retaining said bands in operative position upon said rim.

2. A vehicle tire construction having in combination, a rim provided with a relatively wide central circumferential channel tapered from its open portion inwardly, a plurality of concentric cushioning bands mounted upon said channel and each having a cross sectional shape throughout its circumference frictionally engaging said channel and conforming thereto, said bands carrying a multiplicity of spaced elastic cushions, the cushions of said several bands being staggered, the outermost of said bands having an enlarged outwardly disposed circumferential portion normally disposed outwardly of said rim and channel and compressible inwardly into said channel with wedge effect, and means for retaining said bands in operative position upon said rim.

JOSEPH C. MILLER.